(12) United States Patent
Frankenberg

(10) Patent No.: US 6,182,684 B1
(45) Date of Patent: Feb. 6, 2001

(54) BELLOWS BALANCED VALVE

(75) Inventor: Alfred A. Frankenberg, Blount County, TN (US)

(73) Assignee: Robertshaw Controls Company, Richmond, VA (US)

( * ) Notice: Under 35 U.S.C. 154(b), the term of this patent shall be extended for 0 days.

(21) Appl. No.: 09/270,398

(22) Filed: Mar. 16, 1999

Related U.S. Application Data

(60) Provisional application No. 60/078,611, filed on Mar. 19, 1998.

(51) Int. Cl.$^7$ ............................ F16K 49/00; F16K 31/06; F16K 39/02; F02B 47/08
(52) U.S. Cl. .................... 137/340; 251/129.07; 251/282; 123/568.26
(58) Field of Search ........................ 137/340; 251/129.07; 251/282; 123/568.26, 568.21, 568.12, 568.11

(56) References Cited

U.S. PATENT DOCUMENTS

| | | | |
|---|---|---|---|
| 3,009,678 | * | 11/1961 | Soderberg et al. |
| 3,214,134 | * | 10/1965 | Noakes . |
| 3,627,257 | * | 12/1971 | Stampfli ................. 251/129 |
| 4,052,969 | | 10/1977 | Ando et al. ............... 123/119 A |
| 4,166,607 | | 9/1979 | Webb .................... 251/335 B |
| 4,201,366 | | 5/1980 | Danko et al. .............. 251/335 B |
| 4,493,474 | * | 1/1985 | Ohyama ................... 251/129 |
| 4,662,604 | * | 5/1987 | Cook ..................... 251/129.07 |
| 4,796,854 | * | 1/1989 | Ewing .................... 251/129.07 |
| 4,805,582 | * | 2/1989 | Braun et al. .............. 123/568 |
| 4,889,350 | | 12/1989 | Tranter .................. 277/88 |
| 4,995,589 | | 2/1991 | Adishian et al. .......... 251/335.3 |
| 5,148,678 | * | 9/1992 | Ueda et al. ............... 60/602 |
| 5,460,146 | * | 10/1995 | Frankenberg ............. 123/571 |
| 5,630,444 | | 5/1997 | Callaghan et al. ......... 137/550 |
| 5,632,258 | * | 5/1997 | Tsuzuki et al. ........... 123/571 |
| 5,662,335 | | 9/1997 | Larsen ................... 277/3 |
| 5,769,123 | * | 6/1998 | Heestand et al. .......... 137/625.38 |
| 5,810,030 | | 9/1998 | Uchiyama et al. .......... 137/468 |

* cited by examiner

Primary Examiner—John Rivell
(74) Attorney, Agent, or Firm—Terrence Martin; Jules J. Morris

(57) ABSTRACT

A bellows valve assembly installed in a fluid pathway includes a valve body, a bellows housing positioned adjacent the valve body, and a valve actuator. The valve body is equipped with an inlet, an outlet, a valve bore positioned between the inlet and the outlet, and a valve seat disposed between the inlet and the outlet. A valve closure element having a sealing surface is positioned in the valve bore and is engageable with the valve seat to restrict fluid flow through the valve bore. The valve closure element also has a valve stem that extends from the valve bore through the bellows housing. The valve stem has a lower portion characterized by a first average diameter and an upper portion characterized by a second average diameter that is at least 25% smaller than the first average diameter. The actuator is engageable with the upper portion of the valve stem to move the sealing surface relative to the valve seat. Further, a pressure-balanced bellows assembly is positioned in the bellows housing and has at least one section secured to the valve stem such that the bellows assembly surrounds a portion of said valve stem. The bellows assembly divides the bellows housing into a first chamber defined inside of the bellows assembly and a second chamber defined outside of the bellows assembly. A first passageway is provided to extend between the first chamber and a location in the fluid pathway downstream of the valve seat so as to communicate the fluid pressure downstream of the valve seat to the first chamber. Further, a second fluid passageway is provided to extend between the second chamber and a location in the fluid pathway upstream of the valve seat so as to communicate the fluid pressure upstream of the valve seat to the second chamber.

24 Claims, 1 Drawing Sheet

BELLOWS BALANCED VALVE

This application claims benefit of the filing date of pending Provisional Application Ser. No. 60/078,611 filed on Mar. 19, 1998.

BACKGROUND OF THE INVENTION

The present invention relates generally to a valving device for fluid control applications and, more particularly, to such a valving device having a pressure balanced bellows or bellows assembly.

The use of a bellows assembly within a valve is known. In valving applications, high cycle life may be difficult to achieve when the valve is subjected to high end or cyclical operating pressures. Accordingly, the bellows is preferably designed to be thin and flexible. However, the bellows may also function as a fluid barrier, and thus, the wall of the bellows may be subjected to a pressure differential. In this regard, the wall of the bellows may be designed to be thicker and less flexible, thus decreasing cycle life. To overcome this problem, various approaches have been developed to balance the pressure acting on the walls of the bellows.

In an automobile exhaust gas cleaning system, an exhaust gas recirculation valve (EGR valve) is used. The function of the EGR valve is to recirculate a part of the exhaust gas from the exhaust system to the intake system in accordance with negative pressure in the carburetor. Conventional diaphragm balanced valves, of which many are known in the art, are popular choices for EGR valves. Bellows type valves have been used, but the extreme temperature environments and pressure fluctuations present in the exhaust gas environment typically limits the effectiveness of the conventional bellows type valves.

SUMMARY OF THE INVENTION

It is, therefore, a general object of the invention to provide an improved pressure balanced bellows type valve. It is also one of several objects of the invention to provide such a pressure balanced bellows valves particularly adapted to high temperature applications and, alternatively, to applications wherein the valve is subjected to pressure fluctuations.

A bellows valve assembly according to the invention may be installed in a fluid (e.g., gas or liquid) pathway such as in an exhaust gas recirculation line in automobile installations. The valve assembly includes a valve body, a bellows housing positioned adjacent the valve body, and a valve actuator. The valve body is equipped with an inlet, an outlet, a valve bore positioned between the inlet and the outlet, and a valve seat disposed between the inlet and the outlet. A valve closure element having a sealing surface is positioned in the valve bore and is engageable with the valve seat to restrict fluid flow through the valve bore. The valve closure element also has a valve stem that extends from the sealing surface and the valve bore through the bellows housing. Preferably, the valve stem has a lower portion characterized by a first average diameter and an upper portion characterized by a second average diameter that is at least 25% smaller than the first average diameter. More preferably, the average diameter of the upper portion is about 40% to 60% the average diameter of the lower portion. Further, the actuator preferably includes a linearly-movable plunger that is engageable with the upper portion of the valve stem to move the sealing surface relative to the valve seat.

In one aspect of the invention, the valve assembly includes a pressure-balanced bellows assembly positioned in the bellows housing. The bellows assembly has at least one section secured to the valve stem such that the bellows assembly surrounds a portion of said valve stem (preferably a portion of the lower portion of the valve stem). The bellows assembly divides a pressure balancing chamber of the bellows housing into a first chamber defined inside of the bellows assembly and a second chamber defined outside of the bellows assembly. Preferably, a stem sealing assembly (e.g, including a packing material) is provided to seal or substantially seal an interface between the valve stem and the balancing chamber such that the upper portion of the valve stem is located on a side of the stem sealing assembly opposite of the lower portion and the bellows assembly. Further, a first passageway is provided to extend between the first chamber and a location in the fluid pathway downstream of the valve seat so as to communicate the fluid pressure downstream of the valve seat to the first chamber. A second fluid passageway is also provided to extend between the second chamber and a location in the fluid pathway upstream of the valve seat so as to communicate the fluid pressure upstream of the valve seat to the second chamber.

In another aspect of the invention, the bellows housing of the valve assembly includes a plurality of walls and a coolant passage in at least one of the walls. Coolant flow (e.g., water) through the coolant passage functions to effect heat transfer away from the bellows housing and components therein, and to reduce the temperature rise in other components of the valve assembly (e.g., the actuator).

In one embodiment of the present invention, an exhaust gas recirculation valve assembly is provided having a valve body, a bellows housing, a valve closure element, and a pressure-balanced bellows assembly, as described above. The valve assembly is also equipped with a first passageway communicating a first chamber of a bellows balancing chamber with fluid pressure downstream of a valve seat of the valve body, and a second passageway communicating a second chamber of the bellows balancing chamber with fluid pressure upstream of the valve seat. The valve assembly preferably includes a solenoid operated actuator having a linearly movable plunger for engaging a valve stem of the valve closure element.

DETAILED DESCRIPTION OF THE DRAWINGS

Figure 1:
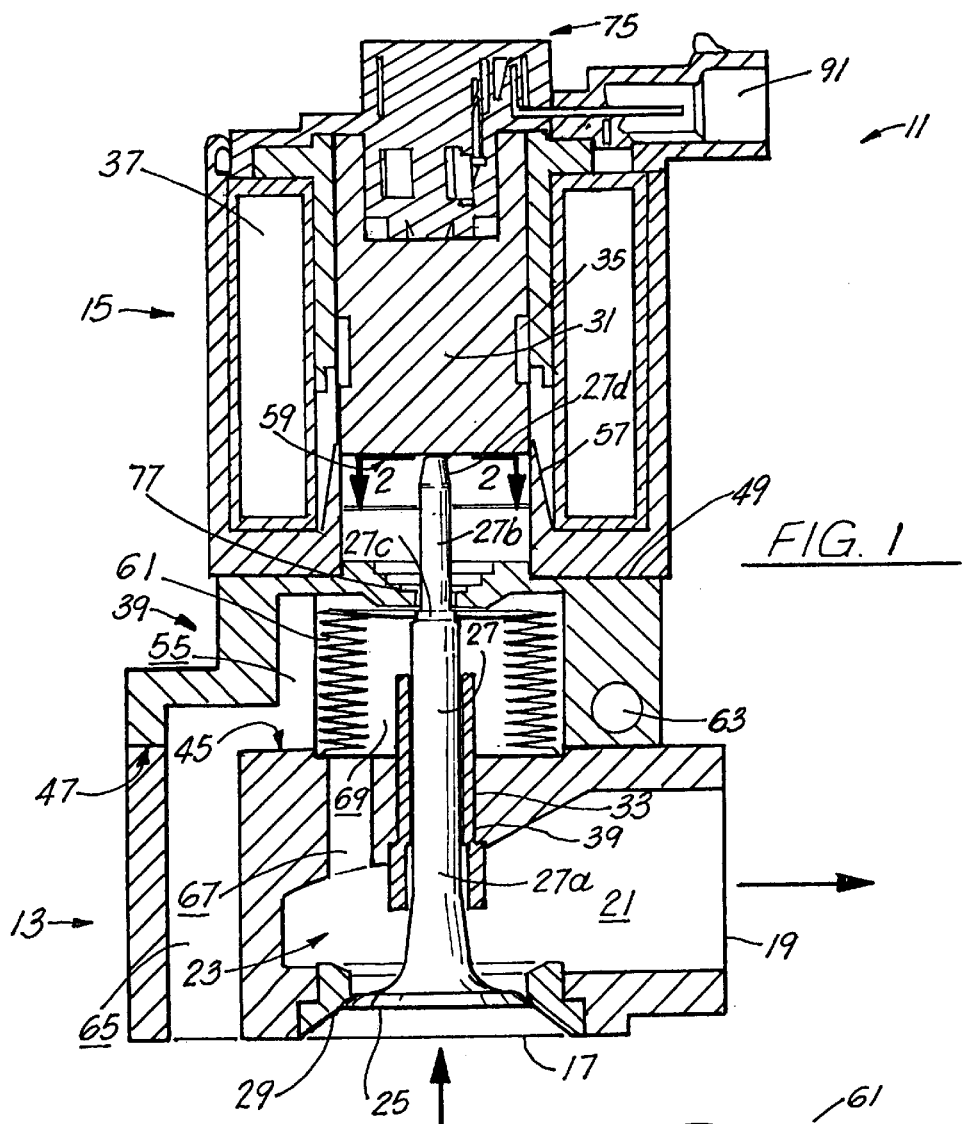
FIG. 1 is a sectional view of a pressure balanced, solenoid-operated bellows valve according to the invention.
Figures 2, 3:
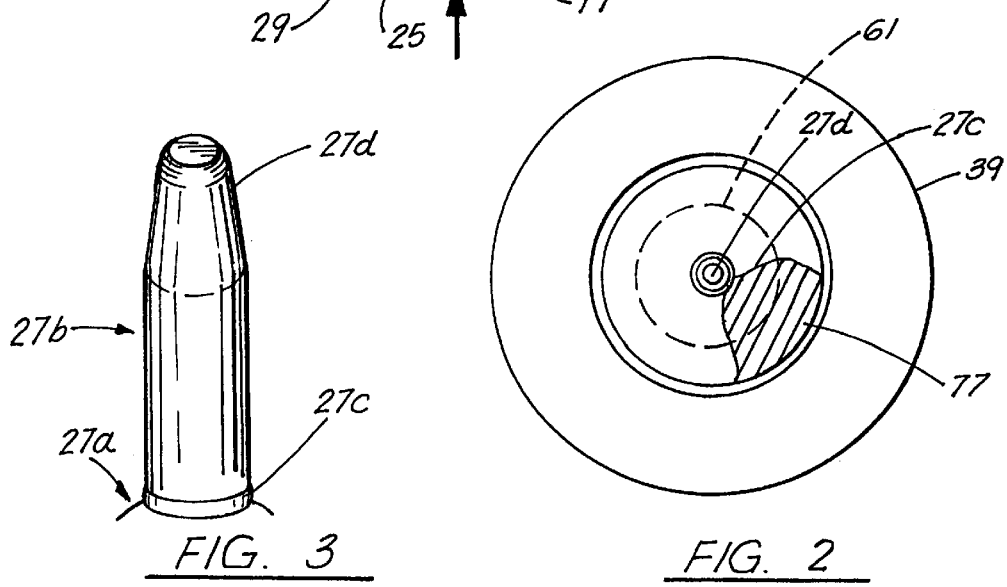
FIG. 2 is a top sectional view of the valve across line 1—1 of FIG. 1.
FIG. 3 is a perspective view of a portion of a valve stem according to the invention.

FIGS. 1–3 depict a solenoid operated exhaust gas recirculation (EGR valve) 11 having a pressure balanced bellows assembly or bellows 61, embodying the invention. It is to be understood that the present invention, although particularly applicable to an EGR valve and/or a solenoid operated EGR valve, is not to be limited to EGR valves or solenoid operated valves. More specifically, the invention is not limited to the solenoid-operated EGR valve depicted in the drawings and described herein. The present invention and its various features are adapted to valving applications other than EGR valves including, but not limited to, valving applications wherein a bellows has proven advantageous. Modifications to the invention (e.g., the bellows and the cooling system, as described below) and/or incorporation of inventive features on other valving devices will be apparent to one skilled in the art, upon viewing the Drawings and reading the Description, provided herein.

Referring now to the vertically-oriented EGR valve 11 depicted in FIG. 1, the valve 11 of the invention includes a valve body 13, an intermediate section or spacer 39 secured atop the valve body 11, and a valve control portion 15 secured atop the spacer 39. FIG. 1 depicts the particular embodiment of the inventive valve 11 in an orientation that is typical for exhaust gas recirculation automobile installations. Although other embodiments of the inventive valve 11 and other orientations are possible, relative distances, dimensions, and directions will be used in the description herein with reference to the elevation view of FIG. 1 and the EGR valve depicted herein.

The valve body 13 is formed with a horizontally disposed inlet portion or inlet 17, a vertically disposed outlet portion or outlet 19 (located downstream of the inlet 17), and a valve cavity or bore 21 extending therebetween. With respect to the valve 11 depicted in FIG. 1, the direction of fluid flow (i.e., gas flow) through the bore 21 is from the inlet 17 to the outlet 19. The bore 21 includes a substantially circular valve seat 29 formed inside the bore 21 and located immediately downstream of the inlet 17. The valve body 13 also has a substantially flat top interface or face 45 that is sealingly engageable with a bottom face 47 of the spacer 39. Further, the spacer 39 has a top face 49 that is engageable with the valve control portion 15. As is further described below, the valve body 13 and the spacer 39 are mated together such that passages formed separately in the two structures align to form passageways which extend from one structure into the other. In particular, the spacer 39 has an outer cavity or chamber 55 and an internal cavity or chamber 69 which fluidly communicate with the pressure at the inlet 17 of the valve body 13 and at the outlet 19 of the valve body 13, respectively.

In one aspect of the invention, a valve closure element 23 is provided which extends upwardly from the valve cavity 21 through a central opening in the top face 45 of the valve body 13 and the bottom face 47 of the spacer 39. Further, the closure element 23 extends centrally through the spacer 39 and through a central opening in the top face 49 of the spacer 39, and into a central cavity 57 of the valve control portion 15. The closure element 23 has, on a bottom end, a circular sealing surface 25 having a peripheral edge that is engageable with the valve seat 29 to restrict fluid flow through the valve bore 21. When the sealing surface 25 is seated against the valve seat 29, the surface area of the sealing surface 25 is subjected to an inlet pressure that may be significantly greater than the pressure in the bore 21. The product of the differential pressure and the surface area of the sealing area creates an upwardly directed force acting on the valve closure element 23. Further, the sealing surface 25 may also be subject to high-frequency, pressure fluctuations which are common in exhaust gas recirculation environment. These pressure fluctuations also act to unseat the sealing surface 25 from valve seat 29.

The valve closure element 23 further includes a valve shaft or stem 27 coextensive with the sealing surface 25 and extending upwardly therefrom. The stem 27 has a lower portion 27a and an upper portion 27b. The lower portion 27a extends from the sealing surface 25 and from the bore 21, and into the internal chamber 69 of the spacer 39. The upper portion 27b extends from the lower portion 51 and into the central cavity 57 of the valve control portion 15. As shown in the FIG. 1, the upper portion 27b has a diameter (or cross-sectional area) that is significantly reduced from the diameter of the lower portion 27a. As best shown in FIGS. 2 and 3, the stem 27 is provided with a further reduced top portion 27d that engages a plunger 31 of the valve control portion 15.

In one embodiment of the invention, the stem 27 has an average diameter in the lower portion 27a of about 0.313" and an average diameter in the upper portion 27b of about 0.150" (i.e., a reduction of about 50% in the diameter of the upper portion 27a). In alternative embodiments, the diameter of the upper portion 27b may be in the range of about 25% to 80% smaller than the diameter of the lower portion 27a. It is to be understood, however, that the actual sizing of the stem diameters for particular valving applications will be apparent to one skilled in the art upon viewing the Drawings and reading the Description provided herein. Preferably, the transition (i.e., reduction of the cross-sectional area of the stem 27) between the lower portion 27a and the upper portion 27b is provided at a step 27c positioned at or just below a stem sealing assembly, generally designated as sealing area 77, in the top face 49 of the spacer 39. The components of the stem sealing area 77 (e.g, stem packing), therefore, contact a reduced area of the stem 27 to seal or substantially seal the interface between the stem 27 and the spacer 39. Thus, in one aspect of the invention, the frictional resistance acting on the stem 27, when the stem 27 is moved (i.e., by the valve control portion 15), is minimized. Further, the pressure present above the top face 45 (which may be significantly different from pressures acting on different portions of the stem 27) is also acts on a reduced area of the stem 27, thereby minimizing the potential for imbalance caused by such external pressure.

Referring again to FIG. 1, the valve 11 is provided with an elongated valve stem bearing 33 that is situated partially in the valve body 13 and partially in the spacer 39. The stem bearing 33 is secured therein, and guides, as well as facilitates, vertical movement and alignment of the valve stem 27. The stem bearing 33 is preferably equipped with packing or other conventional sealing assembly means at its interface with the stem 27.

The valve control portion 15 is an electromagnetic actuator for moving the valve closure element 23 downward, i.e., to disengage the seating surface 25 from the valve seat 29. The actuator includes a conventional electric solenoid 37 for generating a magnetic force responsive to energization, and for moving the linearly movable plunger 31. The construction and operation of the actuator is well known; thus, a detailed description is not necessary. It should be noted, however, that the valve 11 according to the invention is adapted for use with a variety of actuators known in the art. Modifications required to incorporate or to integrate any of such actuators into the structure of the present invention will be apparent to one skilled in the art, upon viewing the Drawings and reading the Description provided herein.

The plunger 31 is preferably a circular rod-shaped member movable within the center cavity 57 of the valve control portion 15. A plunger bearing 35 is provided to guide and facilitate the vertical movement of the plunger 31 within the cavity 57. Further, the plunger 31 is provided with a bottom surface 59, the center of which engages the top portion 27d of the valve stem 27. It should be noted that, according to one aspect of the invention, the plunger 31 and the valve stem 27 are not attached or connected, and are structurally independent of one another (although operable together).

The plunger 31 is, therefore, movable to move the valve stem 27 downwardly through the valve stem bearing 33 and to disengage the sealing surface 25 of the valve closure element 23 from the valve seat 29. Because the valve 11 is of the push-to-open design type, alignment of the plunger bearing 35 and the valve stem bearing 33 is not as critical. Further, because the plunger 31 and the valve stem 27 are in contact, but not connected, any misalignment is readily accommodated. In a further aspect of the invention, the engagement area between the plunger 31 and the stem 27 is advantageously reduced such that the potential for misalignment or imbalance due to the forces of the plunger 31 acting on the stem 27 is further minimized. Accordingly, the present invention provides a valve closure element 11 that is particularly adapted to maintaining its sealing engagement with the valve seat 29 despite otherwise adverse operating conditions.

In another aspect of the invention, a bellows assembly or bellows 61 is located centrally within the chamber 55, and spaced inwardly from the internal walls of the spacer 39, thereby creating a fluid (e.g., air or gas) gap therebetween. The bellows 61 partially seal and define the internal chamber 69 of the spacer 39. The bellows 61 has a bottom convolution or end fixed (i.e., by welding) to the bottom face of the spacer 39 or the top face of the valve body 11. The bellows 61 also has an upper convolution or top end fixed near the step portion 27c of the valve stem 27, and so as to be movable therewith. Accordingly, the bellows 61 is configured to urge or return the valve stem 27 upwardly such that the sealing surface 25 re-seats against valve seat 29. The spring rate of the bellows 61 may be controlled, at least in one way, by choosing the appropriate material and designing the appropriate material thickness of the bellows.

In another aspect of the invention, the spacer 39 is preferably provided with a coolant passage 63, for accommodating fluid flow of a coolant such as water. The fluid flow of the coolant may be directed in a number of ways, as known in the art, including by utilization of an external pumping means, or utilizing the pressure deferential caused by temperature rise, and the like. Fluid flow through the coolant passage 63, in any event, effects heat transfer from the chambers 55, 69 through the walls of the spacer 39, and then heat transfer away from the valve 11 and its components by convective fluid flow outward through the coolant passage 63.

In the particular application of the invention to an EGR valve 11, exhaust gases expose the valve 11 and its components to relatively high temperatures. The solenoid 37 and the bellows 61 are particularly sensitive to such high temperature extremes. Thus, in one aspect of the invention, the inclusion of a spacer 39 having a substantially fluid-filled chambers 55, 69 provides a heat transfer space or barrier between each of the bellows 61 and the solenoid 37, and the exhaust gases flowing through the bore 21 of the valve body 23. Further, coolant in the coolant passage 63 effects heat transfer between the spacer 39 and the coolant, and between the spacer 39 and each of the chambers 55, 69 and the valve body 13. As a result, the temperature rise in the bellows 61, the solenoid 37 and other components are minimized, and the service lives of these valve components are preserved. Further, a less expensive material for the bellows 61 may be selected, instead of a more expensive material specially designed to withstand a much higher temperature rise.

In yet another aspect of the invention, the valve 11 is provided with a balanced bellows arrangement which effectively balances the forces acting on the valve stem 27 caused primarily by differential pressure across the valve seat 29. This particular arrangement includes provision of inlet or upstream passage 65 for fluidly communicating the pressure at or around the valve inlet 17 or valve seat 25 to the outside chamber 55 (i.e., outside of the bellows 61) and an outlet or downstream passage 67 for fluidly communicating the pressure downstream of the valve inlet 17 to the inside chamber 69 (internal of the bellows 61). The mean effective area of the bellows 61 is then designed to approximate the contact area of the valve seat 29, and such that the force (pressure times area) resulting from the differential pressure is effectively canceled by the force of the bellows 61 (thereby balancing the bellows 61).

It should also be noted that the area of the valve stem 27 above the sealing assembly 77 may cause a slight, negligible imbalance to the valve 11. The solenoid 37 drives vertical movement of the plunger 31 against the valve stem 27, so as to seat and unseat the sealing surface 25. However, it is again noted that the substantially reduced diameter of the upper portion 53 of valve stem 27, which protrudes from the spacer 39, reduces the inherent balance typically caused in this area of the device (which is especially significant in the prior art). At the same time, the reduced diameter of the upper portion 53 of the valve stem 27 reduces the engagement area between the valve stem and the sealing area 77, thereby minimizing the friction drag created by such engagement.

Referring again to FIG. 1, the fluid passageways 65, 67 of the bellows balanced valve 11 according to the invention also function as condensate passageways or drains. Preferably, the passageways 65, 67 are directed downwardly so as to facilitate the draining of condensate accumulating or created within the spacer 39. By including this feature in the valve 11, the corrosive effect of the environmental elements in many applications (especially in the EGR application) are reduced considerably.

To further illustrate an application of the various features of the invention, the valve control portion 15 depicted in FIG. 1 is also provided with a feedback sensor assembly 75. The feedback sensor assembly 75 may be provided, for example, with a conventional resistive film type sensor. The changes in the resistance in the resistive film is designed to be proportional to the stroke of the valve 11. Further, electrical connections to the sensor is thereby made via a conventional connector 91, and feedback may be provided by a resistive sensor, a non-contact position sensor, a thermostat measuring gas temperature, or any equivalents thereof In one embodiment of the invention, the bellows 61 is preferably about 0.300" to 0.500" thick and is formed from a metallic material such as inconel 718. The valve stem 27 may be formed from various commercially available materials which perform adequately in high temperature and/or corrosive environments, including 410 stainless steel. The valve body 13 may be made from cast iron steel, as well as stainless steel or carbon steel. The spacer 39, on the other hand, may be formed from aluminum or an aluminum alloy. It should be noted that the aluminum or aluminum alloy provides for a relatively inexpensive spacer material having good heat transfer characteristics.

The foregoing description of the present invention has been presented for purposes of illustration and description. The description is not intended to limit the invention to the form or forms disclosed herein. Consequently, variations and modifications commensurate with the above teachings, and the skill or the knowledge of the relevant art, are within the scope of the invention. The embodiment described herein is further intended to explain the best mode known for practicing the invention and to enable others skilled in the art to utilize the invention in such, or other, embodiments and with various modifications required by the particular applications or uses of the present invention. It is intended that the dependent claims be construed to include alternative embodiments to the extent that is permitted by prior art.

What is claimed is:

1. A bellows valve assembly comprising:

a valve body having an inlet, an outlet, a valve bore positioned between said inlet and said outlet, and a valve seat disposed between said inlet and said outlet;

a housing positioned adjacent said valve body and defining a bellows balancing chamber;

a valve closure element having a sealing surface positioned in said valve bore and engageable with said valve seat to restrict flow through said valve bore, and a valve stem extending from said sealing surface through said bellows housing, said valve stem having a lower portion characterized by a first average diameter and an upper end portion characterized by a second average diameter, wherein said second average diameter is at least about 25% smaller than said first average diameter;

a pressure-balanced bellows assembly positioned in said housing to surround a portion of said valve stem, said bellows assembly having one section secured to said valve stem; and an actuator engageable with said upper end portion of said valve stem to move said sealing surface relative to said valve seat, said actuator being distinct from said upper end portion.

2. The valve assembly of claim 1, wherein said bellows assembly divides said balancing chamber into a first chamber defined inside of said bellows assembly and a second chamber defined outside of said bellows assembly, said first chamber being in fluid communication with a fluid pressure downstream of said valve seat and said second chamber being in fluid communication with a fluid pressure upstream of said valve seat.

3. The valve assembly of claim 2, wherein said valve body further includes a first passageway communicating said first chamber with said fluid pressure downstream of said valve seat, and a second passageway communicating said second chamber with said fluid pressure upstream of said valve seat.

4. The valve assembly of claim 1, wherein said portion which said bellows assembly surrounds is a portion of said lower portion.

5. The valve assembly of claim 1, further comprising a stem sealing assembly for substantially sealing an interface between said valve stem and said balancing chamber, said upper portion of said stem being located on a side of said valve stem sealing assembly opposite said bellows assembly.

6. The valve assembly of claim 1, wherein said average diameter of said upper portion is between about 30% to 80% smaller than said average diameter of said lower portion.

7. The valve assembly of claim 1, wherein said average diameter of said upper portion is between about 40% to 60% smaller than said average diameter of said lower portion.

8. The valve assembly of claim 1, wherein said housing includes a plurality of exterior walls, at least one of said walls including a coolant passage for accommodating flow of a coolant therethrough.

9. The valve assembly of claim 1, wherein said actuator includes a linearly movable plunger engageable with said upper portion, said plunger being structurally independent of said upper portion.

10. The valve assembly of claim 1, wherein said actuator is a solenoid-operated actuator.

11. A bellows valve assembly comprising:

a valve body having an inlet, an outlet, a valve bore positioned between said inlet and said outlet, and a valve seat disposed between said inlet and said outlet;

a housing positioned adjacent said valve body and defining a bellows balancing chamber;

a valve closure element having a sealing surface positioned in said valve bore and engageable with said valve seat to restrict fluid flow through said valve bore, and a valve stem extending from said sealing surface through said bellows housing;

a pressure-balanced bellows assembly having at least one section secured to said valve stem, said bellows assembly being spaced from surrounding a portion of said valve stem to divide said bellows balancing chamber into a first chamber defined inside of said bellows assembly and a second chamber defined outside of said bellows assembly between said valve stem and said bellows assembly, wherein said first chamber is in communication with a fluid pressure downstream of said valve seat and said second chamber is in communication with a fluid pressure upstream of said valve seat and wherein said valve stem has a lower portion characterized by a first average diameter, and an upper portion characterized by a second average diameter and engageable with said actuator, said second average diameter being substantially smaller than said first average diameter; and an actuator disposed on a side of said housing opposite said valve body, said actuator being engageable with said valve stem to move said sealing surface relative to said valve seat.

12. The valve assembly of claim 11, wherein said valve body further includes a first passageway communicating said first chamber with said fluid pressure downstream of said valve seat, and a second passageway communicating said second chamber with said fluid pressure upstream of said valve seat.

13. The valve assembly of claim 12, wherein said portion which said bellows assembly surrounds is a portion of said lower portion.

14. The valve assembly of claim 12, further comprising a stem sealing assembly for substantially sealing an interface between said valve stem and said balancing chamber, said upper portion of said valve stem being located on a side of said sealing assembly opposite said bellows assembly.

15. The valve assembly of claim 12, wherein said average diameter of said upper portion is at least about 25% smaller than said average diameter of said lower portion.

16. The valve assembly of claim 12, wherein said average diameter of said upper portion is between about 40% to 60% smaller than said average diameter of said lower portion.

17. The valve assembly of claim 12, wherein said actuator is a solenoid-operated actuator having a linearly movable plunger for engaging said upper portion.

18. The valve assembly of claim 11, wherein said intermediate housing includes a plurality of exterior walls, at least one of said walls including a coolant passage for accommodating flow of a coolant therethrough.

19. An exhaust gas recirculation valve assembly comprising:

a valve body having an inlet, an outlet, a valve bore positioned between said inlet and said outlet, and a valve seat disposed between said inlet and said outlet;

a housing positioned adjacent said valve body and defining a bellows balancing chamber therein;

a valve closure element having a sealing surface positioned in said valve bore and engageable with said valve seat to restrict fluid flow through said valve cavity, and a valve stem having a lower portion extending from said valve sealing surface into said bellows balancing chamber and an upper portion extending from said lower portion, wherein said upper portion is characterized by an average diameter that is at least about 25% smaller than an average diameter of said lower portion;

a pressure-balanced bellows assembly having an end section fixed to said lower portion of said valve stem, said bellows assembly being positioned in said bellows housing to surround a portion of said lower portion, wherein said bellows assembly divides said balancing chamber into a first chamber defined between said bellows assembly and said lower portion and a second chamber defined outside said bellows assembly;

an actuator positioned on a side of said housing opposite said valve body, said actuator being engageable with said upper portion of said valve stem to move said sealing surface relative to said valve seat;

a first passageway communicating said first chamber with a fluid pressure downstream of said valve seat; and a second passageway communicating said second chamber with a fluid pressure upstream of said valve seat.

20. The valve assembly of claim 19, wherein said housing has a plurality of walls, at least one of said walls including a coolant passage for cooling said bellows housing.

21. The valve assembly of claim 20, further comprising a stem sealing assembly for substantially sealing an interface between said valve stem and said balancing chamber, said upper portion of said valve stem being located on a side of said stem sealing assembly opposite said lower portion.

22. The valve assembly of claim 21, wherein said actuator is a solenoid operated actuator including a linearly movable plunger engageable with said upper portion of said valve stem.

23. The valve assembly of claim 22, wherein said average diameter of said upper portion is between about 40% to 60% smaller than said average diameter of said lower portion.

24. The valve assembly of claim 19, wherein each of said first and second passageways are adapted to drain condensate from said first and second chambers, respectively.

* * * * *